United States Patent [19]
Zhang

[11] Patent Number: 5,657,294
[45] Date of Patent: Aug. 12, 1997

[54] SHORT WINDOW NORM OPTIMIZATION FOR MULTI-SOURCE MULTI-COMPONENT SEISMIC DATA

[75] Inventor: Yaohui Zhang, Tulsa, Okla.

[73] Assignee: Amoco Corporation, Chicago, Ill.

[21] Appl. No.: 533,079

[22] Filed: Sep. 25, 1995

[51] Int. Cl.$^6$ ................................................. G01V 1/28
[52] U.S. Cl. ................................................. 367/75; 367/38
[58] Field of Search .................................. 367/38, 59, 75; 364/421

[56] References Cited

U.S. PATENT DOCUMENTS

| | | | |
|---|---|---|---|
| 4,803,666 | 2/1989 | Alford | 367/36 |
| 4,817,061 | 3/1989 | Alford et al. | 367/75 |
| 4,903,244 | 2/1990 | Alford | 367/36 |
| 4,933,913 | 6/1990 | Thomsen | 367/75 |
| 5,029,146 | 7/1991 | Alford | 367/75 |
| 5,402,392 | 3/1995 | Lu et al. | 367/75 |

OTHER PUBLICATIONS

Alford, R.M., "Shear Data in the Presence of Azimuthal Anistropy", *Expanded Abstracts, 56th Int'l. SEG Mtg.* Houston, pp. 476–479, 1986.

Thomsen, L.A., "Reflection seismology over azimuthal anisotropic media", *Geophysics*, 53(3), pp. 304–313, 1988.

Nicoletis, L., Client, C., and Lefeuvre, F., "Shear–wave splitting measurement from multi–shot VSP data", *Expanded Abstracts*, 58th Intl. SEG Mtg., Anaheim, pp. 527–530, 1988.

Murtha, P.E., "Estimation of the rotation transformation angle for shear wave data acquired in azimuthally anisotropic regions", *AGU/SEG Chapman Conference on Seismic Anisotropy of the Earth's Crust*, Berkeley, CA, 1988.

Li, X. Y. and Crampin, S., "Case studies of complex component analysis of shear–wave splitting", *Expanded Abstracts*, 60th Intl. SEG Mtg., San Francisco, pp. 1427–1430, 1990.

Li, X.Y. and Crampin, S., "Linear–transform techniques for analyzing shear–wave splitting in four–component seismic data", *Expanded Abstracts*, 61st Intl. SEG Mtg., pp. 51–54, 1991.

*Primary Examiner*—Ian J. Lobo
*Attorney, Agent, or Firm*—James A. Gabala; Robert E. Sloat

[57] ABSTRACT

A method for processing multi-source multi-component shear wave seismic data. The method comprises the steps of: acquiring four component shear wave seismic data; converting the data into a matrix that is a function of an angles of rotation relative to a reference axis; computing a time independent norm of the elements of the matrix; and finding the angles of rotation where the difference between the sum of the norms of the in-line elements and the sum of the norms of the cross-line elements is maximized.

17 Claims, 6 Drawing Sheets
(2 of 10 Drawing(s) in Color)

SHORT WINDOW NORM OPTIMIZATION FOR MULTI-SOURCE MULTI-COMPONENT SEISMIC DATA

TECHNICAL FIELD

This invention relates to the general subject of oil and gas exploration and, in particular, to seismic exploration methods and processes using shear waves passing through anisotropic layers of the earth.

BACKGROUND OF THE INVENTION

Seismic shear wave splitting, utilizing Multi-Source and Multi-Component (Ms-Mc) shear-wave seismic data, is one technique for the detection of fracture zones and for the extraction of lithologic information in subsurface geologic strata. In patricular, four. component (employing both in-line and cross-line sources and receivers) Ms-Mc shear wave data has been shown to be an effective tool for the detection of fracture zones in subsurface geologic strata. One difficulty, in processing such data, is determining the rotation angle for aligning the shear wave sources and detectors with the shear waves propagating within the earth.

Alford introduced a coordinate transform (often refered to as "Alford Rotation") to rotate four component seismic shear wave data (See Alford, R. M, "Shear Data in the Presence of Azimuthal Anisotropy", *Expanded Abstracts, 56th Int'l. SEG Mtg.* Houston, pp. 476–479, 1986; and U.S. Pat. Nos.: 4,817,061; 4,803,666; 5,025,332; 4,903,244; and 5,029,146). In general, the process involves choosing a number of rotation angles, applying these angles to the four component data set, and finding an angle by visual comparison which minimized the seismic energy in the mismatched components.

Although Alford Rotation has been proven to be useful, there are some limitations. Alford Rotation works well when fracture orientations along a seismic line are uniform or sectionally uniform, or when the acquisition direction is not aligned with azimuthal anisotropic direction that is associated with fracturing in a layer with possible hydrocarbon content. However, when shear waves pass through a multi-layer medium, they undergo re-splitting each layer boundary where the anisotropic principle axes change. Thus, deeper subsurface anisotropy is affected by the layers adjacent to the observation point on the surface, Data processing in presence of anisotropy in multi-layer medium is quite complicated; a simple Alford Rotation does not, in general, provide the desired results. More importantly, the output is coordinate-system dependent. The process also assumes a constant rotation angle for all times, or at least for specific time windows. In general, the inhomogeneity and complexity of subsurface geological structures, do not satisfy this condition. In other words, the application of Alford Rotation is limited and, if not correctly applied, could possibly introduce significant numerical errors.

Others have developed methods and processes to gain a better understanding of anisotropy and overcome some earlier problems. Thomsen (See Thomsen, L. A., "Reflection seismology over azimuthal anisotropic media", *Geophysics*, 53(3), pp. 304–313, 1988) gave a derivation of the basic Alford process and an alternative process (often refered to as "Thomsen Rotation) which employs only one polarization of source (i.e., a single-source/multi-receiver, SS/MR technique; also see U.S. Pat. Nos. 4,888,743 and 4,933,913). Nicoletis (See Nicoletis, L., Client, C., and Lefeuvre, F., "Shear-wave splitting measurement from multi-shot VSP data", *Expanded Abstracts*, 58th Intl. SEG Mtg., Anaheim, pp. 527–530, 1988); Murtha (See Murtha, P. E., "Estimation of the rotation transformation angle for shear wave data acquired in azimuthally anisotropic regions", *AGU/SEG Chapman Conference on Seismic Anisotropy of the Earth's Crust*, Berkeley, Calif., 1988); and Li and Crampin (See Li, X. Y. and Crampin, S., "Case studies of complex component analysis of shear-wave splitting", *Expanded Abstracts*, 60th Intl. SEG Mtg, San Francisco, pp. 1427–1430, 1990; and "Linear-transform techniques for analyzing shear-wave splitting in four-component seismic data", *Expanded Abstracts*, 61st Intl. SEG Mtg., pp. 51–54, 1991); have made other contributions. Some of these methods have worked well on synthetic data; however, when applied to field data, some methods produced unstable results in the determination of rotation angles.

Clearly, improvement is needed.

SUMMARY OF THE INVENTION

A general object of the invention is to provide an improved method for processing Multi-Source Multi-Component (Ms-Mc) shear wave seismic data.

Another objective of the invention is to provide an improved method of processing of both vertical seismic profile (VSP) shear wave seismic data and surface reflection seismic data.

Yet another objective of the invention is to provide an improved method for processing Ms-Mc shear wave seismic data for wave field reconstruction.

Still another object of the invention is to optimize the information contribution of the acquired Ms-Mc seismic data.

One specific object of the invention is to provide an optimization process to remove time dependence within a short time window.

In accordance with the present invention, a method is disclosed for processing Multi-Source Multi-Component (Ms-Mc) shear wave seismic data. In one embodiment of the invention, that method, alternately referred to as "Short Window Mini-Max Norm Optimization" or "Mini-Max", comprises the steps of: acquiring four component shear wave seismic data from an anisotropic sub-surface formation relative to a reference axis; converting the data into a matrix that is a function of an angle of rotation relative to the reference axis; computing a time independent norm of the elements of the matrix; and computing the angle of rotation where the difference between the sum of the norms of the in-line elements and the sum of the norms of the cross-line elements is maximized.

The present invention opens a new area in the processing of both Multi-source and Multi-component vertical seismic profile (VSP) and surface reflection seismic data. The invention utilizes optimization theory and methods in a normed linear vector space to optimize the information contribution of the acquired Ms-Mc seismic data by a two step process: removing time dependence by using the p-norm of the pre-rotated seismic traces, and finding the optimal angle of rotation by maximizing the difference between the sum of the norms of the in-line seismic traces and the sum of the cross-line seismic traces within a short time window. It produces seismic traces wherein the fast and slow shear waves are well separated in presence of azimuthal anisotropy. The results obtained can be used for extraction of anisotropic and other lithologic information related to subsurface geology.

Another important advantage of the invention is that the Alford rotation angle is directly determined by simultaneously maximizing the diagonal components and minimizing the off-diagonal components of a Ms-Mc data matrix. The process is automatically performed by a computer and does not require visual comparison of mismatched components. This technique is also capable of handling Ms-Mc shear wave data acquired with crooked geometry. The method has been tested on both synthetic and field data. It has been demonstrated to be an effective tool for processing Ms-Mc shear wave seismic data for the determination of anisotropic directions.

Numerous other advantages and features of the present invention will become readily apparent from the following detailed description of the invention, the embodiments described therein, from the claims, and from the accompanying drawings.

BRIEF DESCRIPTION OF THE DRAWINGS

The file of this patent contains at least one drawing executed in color. Copies of this patent with color drawings will be provided by the Patent and Trademark office upon request and payment of the necessary fee.

DETAILED DESCRIPTION

Figure 1:
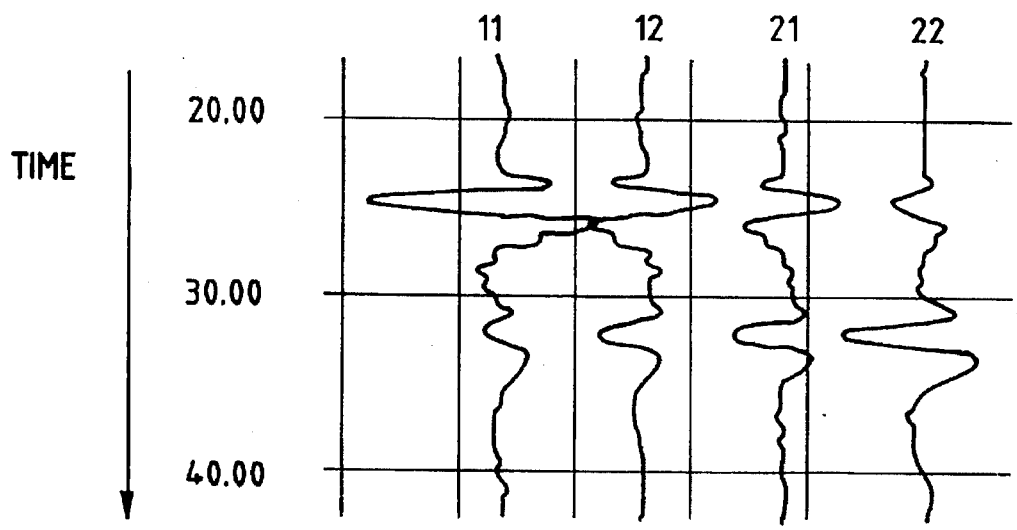
FIG. 1 is a schematic diagram illustrating the traces of a four component Ms-Mc shear wave data set.

While this invention is susceptible of embodiment in many different forms, there is shown in the drawings, and will herein be described in detail, one specific embodiment of the invention. It should be understood, however, that the present disclosure is to be considered an exemplification of the principles of the invention and is not intended to limit the invention to the specific embodiment illustrated.

Conventional multi-source/multi-receiver (MS/MR) acquisition (with in-line and cross-line sources, in-line and cross-line receivers) results in four traces which comprise a 2 by 2 tensor S(t) with time-dependent components $s_{ij}(t)$:

$$S(t) = \begin{bmatrix} s_{11}(t) & s_{12}(t) \\ s_{21}(t) & s_{22}(t) \end{bmatrix} \quad (1)$$

Choosing "x" as the in-line direction and "y" as the cross-line direction, and indexing these in the conventional way (x, y)=(1, 2), then the trace with in-line source, in-line receiver is denoted $s_{11}(t)$. The cross-line-cross-line trace is then $s_{22}(t)$, and the traces with mis-matched source and receiver, $s_{12}(t)$ and $s_{21}(t)$, lay off the diagonal (See FIG. 1).

In general, a cross-line receiver will record both arrivals; the same is true for an in-line receiver. This happens, in general, whether the source is oriented in-line or cross-line; the source orientation affects only the relative excitation of the two modes, which depends upon the trigonometric factors of vector decomposition.

If the delay between the two shear modes is non-negligible, but less than the duration of the wavelet, then complicated interferences (between the two modes) will occur on each of these four traces, rendering them difficult to interpret. However, in the special case where the source is aligned with one of the two special directions of the rock, only one wave is excited. For example, if the in-line source happens to be parallel to the "fast" direction, then only the "fast" mode is excited; it is then recorded on the in-line receiver while the mis-matched receiver receives nothing. The other mode is excited only by the cross-line source and received only by the cross-line receiver.

Since the set of four observed traces $s_{ij}$ is a tensor, it can be rotated, via a tensor rotation operation, to refer to new coordinate axes which are aligned with the special directions of the rock, as above. Alford showed that, through application of the MS/MR rotation technique which now bears his name, one may calculate (from four generally uninterpretable traces):

One "fast" trace (labelled 22 in FIG. 3), recording a shear wave which is unaffected by the cracks (in the simple case of one set of vertical, parallel cracks);

One "slow" trace (labelled 11 in FIG. 3), recording a shear wave strongly affected by the cracks; and Two traces (labelled 12 and 21 in FIG. 3) which are approximately null.

The constant angle Alford rotation is defined as:

$$\mathcal{R}(\theta_r,\theta_s)\{S(t)\}=R(\theta_r)R^{-1}(\theta_s)=W(\theta_r,\theta_s,t) \quad (2)$$

Where $\mathcal{R}(\theta_r,\theta_s)$ denotes Alford rotation operator. $R(\theta_r)$, the receiver rotation matrix, is defined as:

$$R(\theta_r) = \begin{bmatrix} \cos\theta_r & \sin\theta_r \\ -\sin\theta_r & \cos\theta_r \end{bmatrix} \quad (3)$$

and $R(\theta_s)$, the source rotation matrix, is defined as:

$$R^{-1}(\theta_s) = \begin{bmatrix} \cos\theta_s & -\sin\theta_s \\ \sin\theta_s & \cos\theta_s \end{bmatrix} \quad (4)$$

and $$W(\theta_r,\theta_s,t) = \begin{bmatrix} w_{11}(\theta_r,\theta_s,t) & w_{12}(\theta_r,\theta_s,t) \\ w_{21}(\theta_r,\theta_s,t) & w_{22}(\theta_r,\theta_s,t) \end{bmatrix} \quad (5)$$

represents the four component shear wave data after receiver and source rotations by angles $\theta_r,\theta_s$.

Given a short time window, $[t_0,t_1]$, the "p-norm" or the norm on $L_p[t_0,t_1]$ space at receiver and source rotation angles $\theta_r,\theta_s$ for each pro-rotated component is obtained by the following equation:

$$\|e_{ij}(\theta_r,\theta_s)\|_p = \sqrt[p]{\sum_{k=1}^{N} |w_{ij}(\theta_r,\theta_s,k\Delta t+t_0)|^p} \quad (6)$$

where: i=1,2, j=1,2, $\Delta t$ is the sampling interval and $N=(t_0, t_1)/\Delta t$ and $1 \leq p < \infty$. The norm $\|e_{ij}(\theta_r,\theta_s)\|_p$ is proportional to the amplitude of the ij-th component and represents the contribution of that component within the short window $[t_0,t_1]$. It is a real-valued function of $\theta_r$ and $\theta_s$ and no longer a function of time t. This property of the norm can be used to find the optimal rotation angles for Ms-Mc shear wave data. This length of the time window $[t_0,t_1]$ is approximately the length of the dominant seismic wavelet plus the time delay between the fast and slow shear waves. This length is relatively short (e.g., less than 0.7 sec.) compared to the overall length (e.g., 4 to 7 sec.) of the seismic trace.

Several optimization criteria in normed linear vector space can be used to determine the optimal rotation angle:

(A) Minimize the sum of the $I_p$ norms of the cross terms:

$$\text{MIN}\{\|e_{12}(\theta_r, \theta_s)\|_p + \|e_{21}(\theta_r,\theta_s)\|_p\}|_{\theta_r,\theta_s=\text{optimal}(\theta_r,\theta_s)} \quad (7)$$

(B) Maximize the sum of the $I_p$ norms of the diagonal terms:

$$\text{MAX}\{\|e_{11}(\theta_r, \theta_s)\|_p + \|e_{22}(\theta_r,\theta_s)\|_p\}|_{\theta_r,\theta_s=\text{optimal}(\theta_r,\theta_s)} \quad 8)$$

(C) Maximize the difference of (A) and (B). In other words, there exists two rotation angles $\theta_{roptimal}$, $\theta_{soptimal}$ such that $\|e_{12}(\theta_r,\theta_s)\|_p$ and $\|e_{21}(\theta)\|_p$ be minimized and $\|e_{11}(\theta)\|_p$ and $\|e_{22}(\theta)\|_p$ will be maximized simultaneously within a short window $[t_0,t_1]$. This optimal angles are obtained from the equation:

$$\text{MAX}\{(\|e_{11}(\theta_r,\theta_s)\|_p + \|e_{22}(\theta_r,\theta_s)\|_p) - (\|e_{12}(\theta_r,\theta_s)\|_p + \|e_{21}(\theta_r, \theta_s)\|_p)\}|_{\theta_r,\theta_s=\text{optimal}(\theta_r,\theta_s)} \quad (9)$$

If the corresponding in-line and cross-line sources and the receivers are oriented in the same direction (i.e, $\theta_r=\theta_s=\theta$) equations (7), (8), and (9) will be simplified as:

$$\text{MIN}\{\|e_{12}(\theta)\|_p + \|e_{21}(\theta)\|_p\}|_{\theta=\theta\text{optimal}}, \quad (10)$$

$$\text{MAX}\{\|e_{11}(\theta)\|_p + \|e_{22}(\theta)\|_p\}|_{\theta=\theta\text{optimal}}, \quad (11)$$

and $$\text{MAX}\{(\|e_{11}(\theta)\|_p + \|e_{22}(\theta)\|_p) - (\|e_{12}(\theta)\|_p + \|e_{21}(\theta)\|_p)\}|_{\theta=\theta\text{optimal}}, \quad (12)$$

Numerical Results

Two tests are presented here to demonstrate how this the process of the invention automatically determines the optimal rotation angle for Ms-Mc shear wave data.

Figure 2:
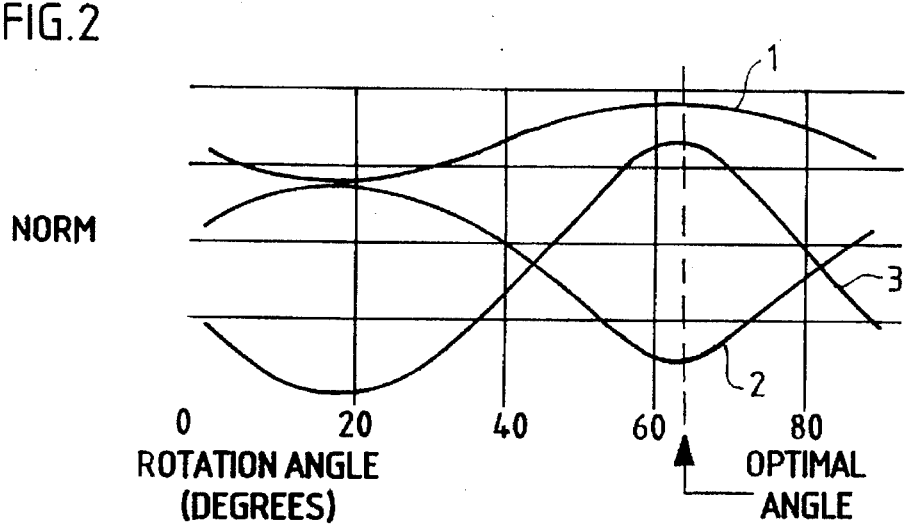
FIG. 2 depicts the results of applying equations (10), (11) and (12) to data of FIG. 1.
Figure 3:
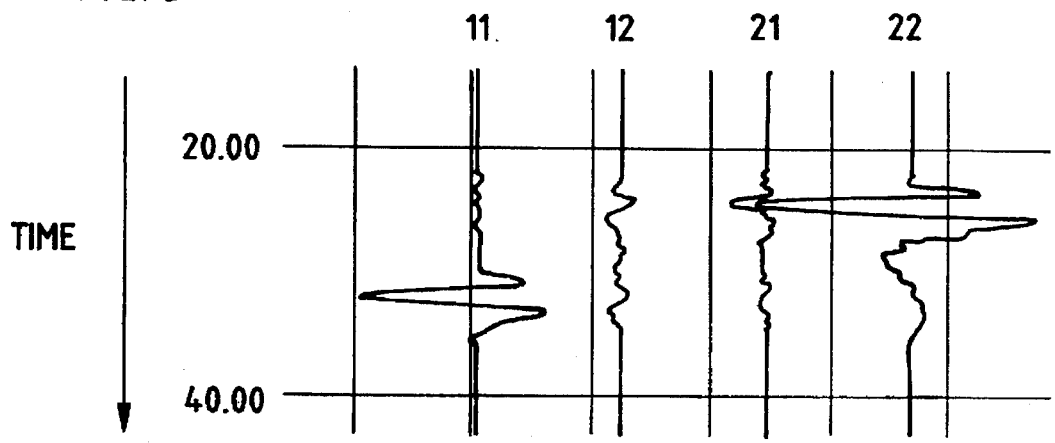
FIG. 3 illustrates the four component Ms-Mc shear wave data set obtained by applying the process of the invention to the data of FIG. 1.

The first test used Ms-Mc shear wave data from laboratory observation. In this test set, the direction of fractures in the anisotropic medium was at 63 degrees to the direction of the in-line source direction. The input data is shown in FIG. 1. The optimization results, given by equation (10), curve 2, equation (11), curve 1, and equation (12), curve 3, with p=1.63 in equation (5), are shown in FIG. 2. Here the optimal angle obtained from the process of the invention is 63 degrees which is consistent with the known set-up for laboratory observation. The optimized results are shown in FIG. 3.

Figure 4:
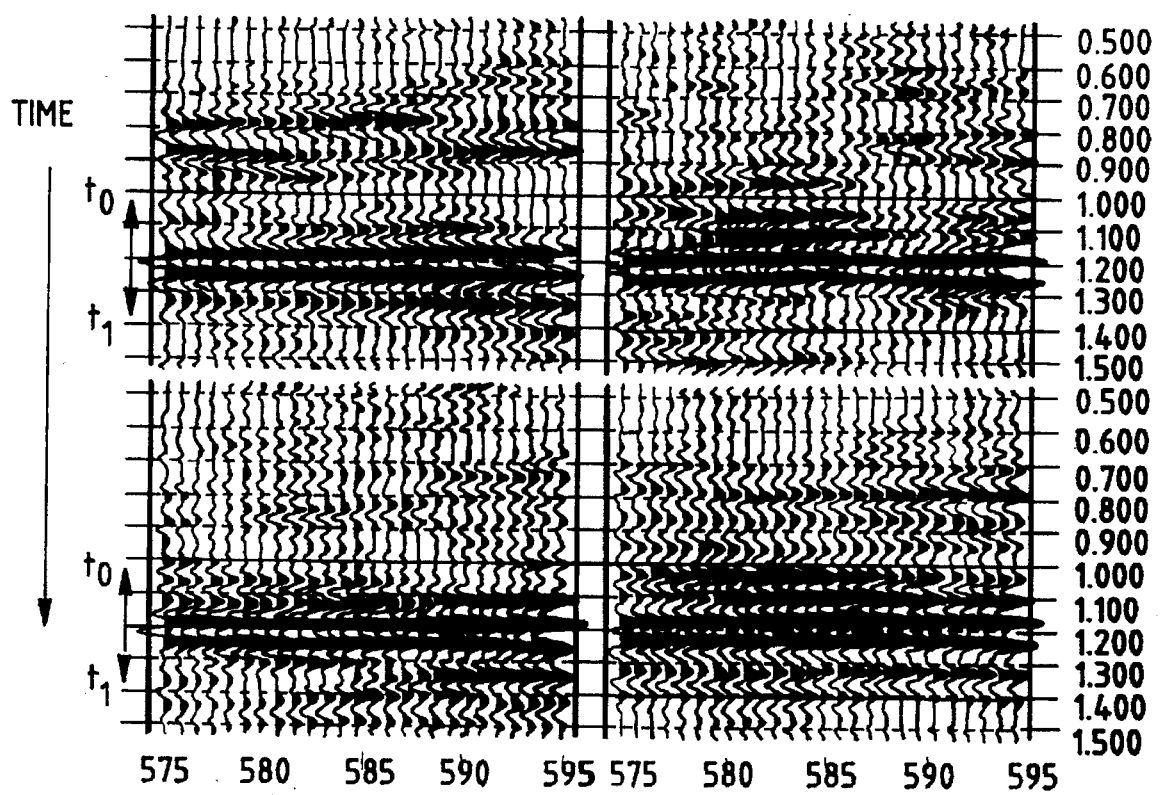
FIG. 4 depicts a four component Ms-Mc shear wave data set (stacked) obtained from measurements in the San Juan Basin.
Figure 5:
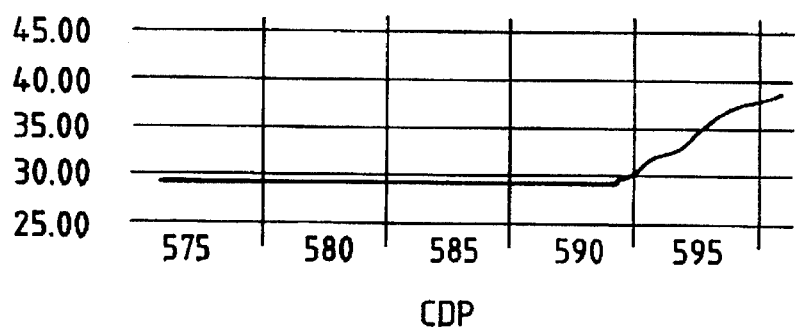
FIG. 5 depicts the optimum rotation angle for the stacked data of FIG. 4 by applying the process of the invention.
Figure 6:
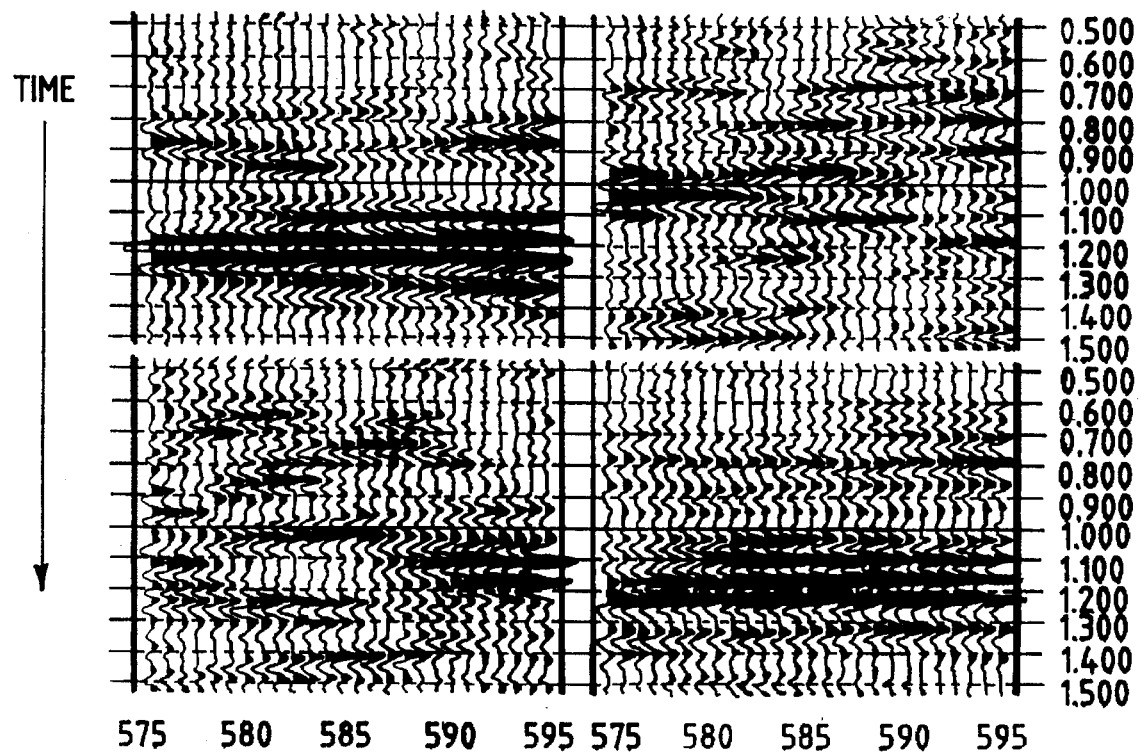
FIG. 6 depicts the data set of FIG. 4 after applying the rotational angles of FIG. 5.

The second data set comprises field data acquired in the San Juan Basin of Colorado. The four component shear wave stacked data is shown in FIG. 4: Applying the process of the invention in the short time windows, [1.0 sec, 1.4 sec] gives the optimal rotation angles shown in FIG. 5 for the norm with p=1.63 in equation (6). The optimal rotation angles are not constant in this case. Using the angles shown in FIG. 5, the input data is rotated and the optimized results are shown in FIG. 6.

Applications to San Juan Basin Ms-Mc Shear Wave Data

Figure 7:
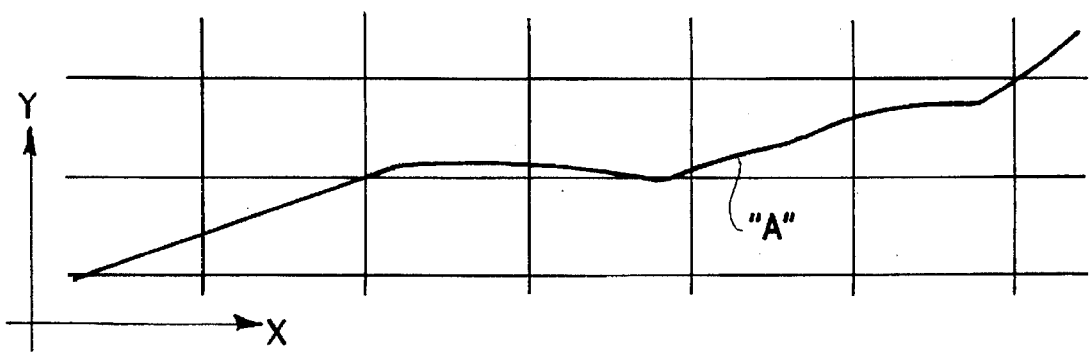
FIG. 7 depicts a broken or crooked field survey line.
Figure 8:
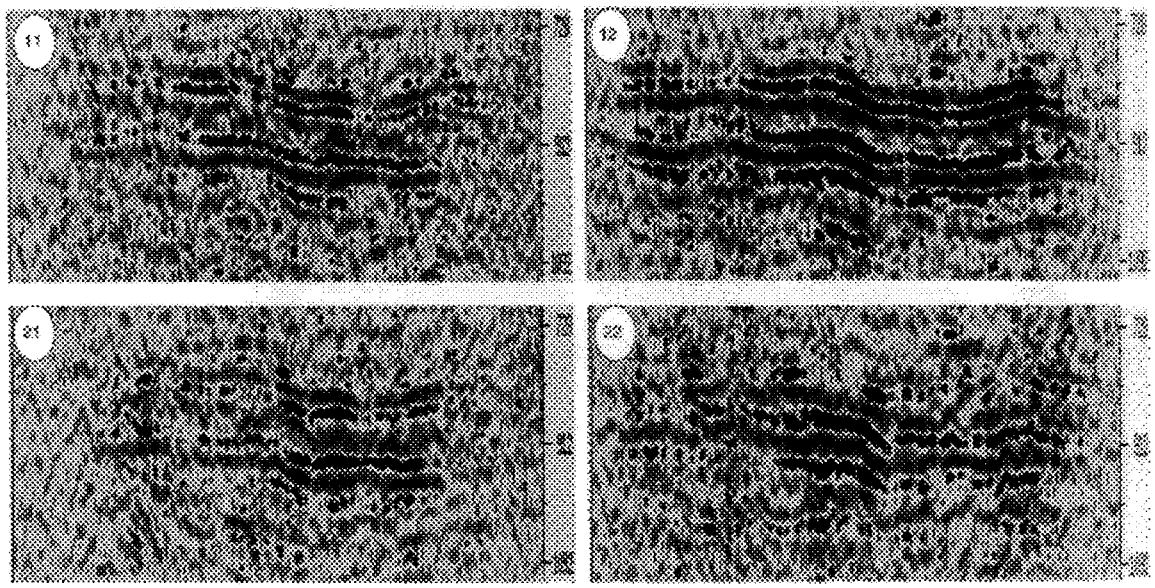
FIG. 8 depicts the four component Ms-Mc shear wave data set (stacked) obtained from measurements along the survey line of FIG. 7.
Figure 9:
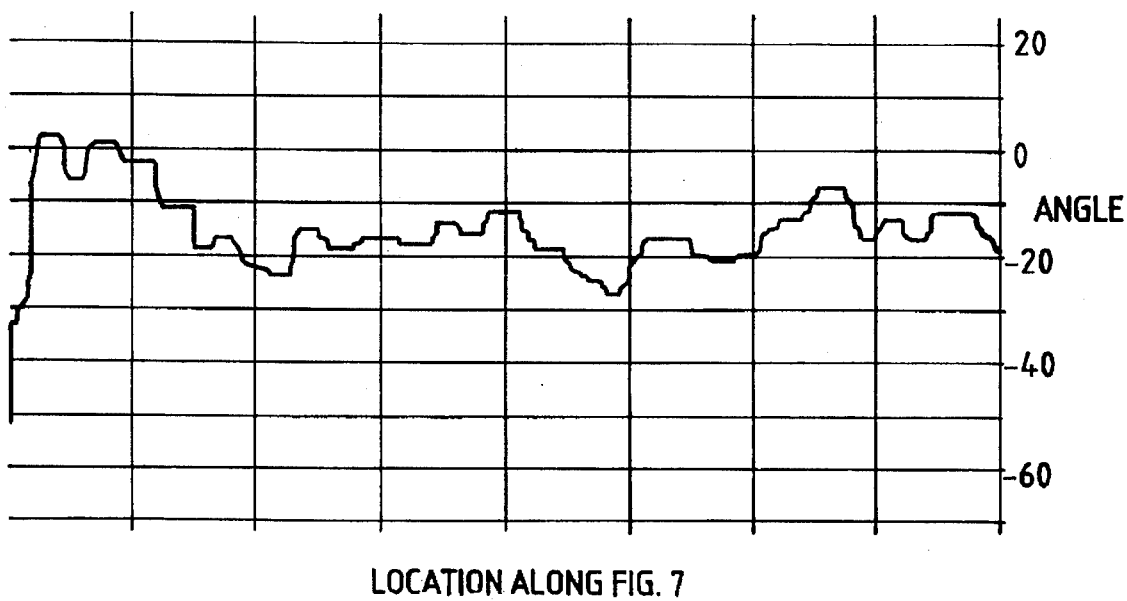
FIG. 9 depicts the optimum rotation angle for the stacked data of FIG. 8 by applying the process of the invention.
Figure 10:
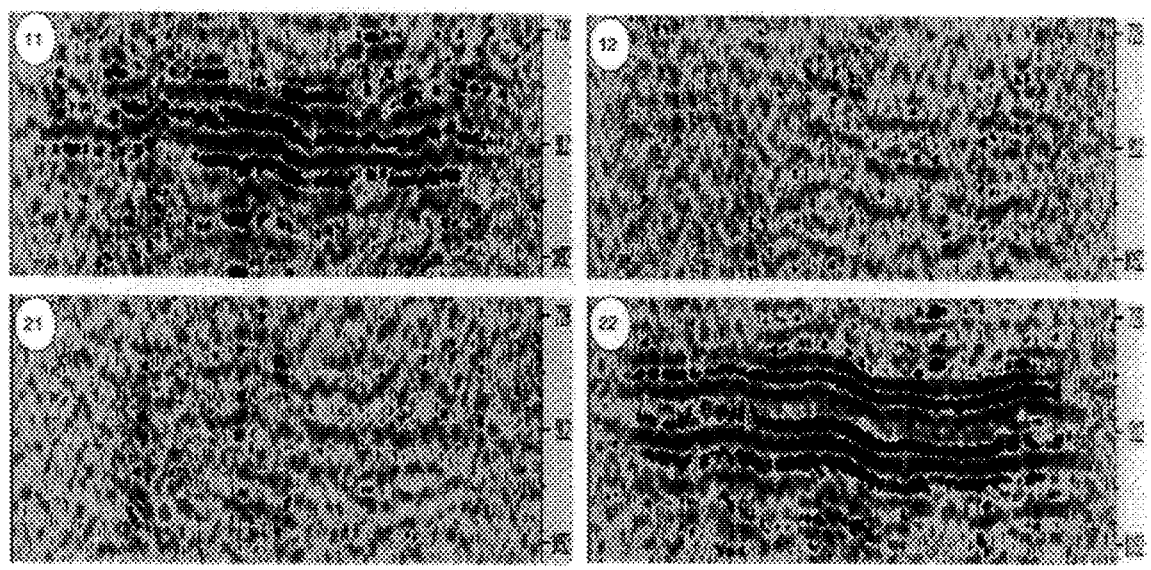
FIG. 10 depicts the data set of FIG. 8 after applying the rotational angles of FIG. 9.

The process of the invention has been applied to a variety of Ms-Mc shear wave data sets. FIG. 8 depicts a four component CDP stacked shear wave data set obtained from a survey line "A" (See FIG. 7) in the San Juan Basin. It also demonstrates how the invention may be applied to crooked line geometry. If a visual comparison method is used to determine the optimum rotation direction, the data has to be broken into several sections and each section has to be processed separately. Using the process of the invention, the rotation angle along the acquisition line is automatically determined. FIG. 9 shows the optimal rotation angles along the acquisition line obtained from applying the process of the invention. The average rotation angle is about -20 degrees. The optimized output is shown in FIG. 10.

It can be seen that the process of the invention determines the orientation of the fractures correctly without breaking the crooked line into several sections. By allowing the vibrator source to be positioned at any orientation during data acquisition, even if the line direction is crooked due to topography or other constraints, the invention makes Ms-Mc shear wave data acquisition easier and more economical.

After preprocessing (static corrections, noise reduction, CMP stacking, etc.), days or weeks have often been needed to perform rotation processing of Ms-Mc data. Using the method of the present invention, the cycle time of processing Ms-Mc seismic shear wave data can be reduced to minutes after the data is loaded on a computer workstation. The precision of the results has been determined to be of the order of one degree. In comparison with linear transform techniques, the process of the invention takes the same amount of CPU time; however, more accurate and stable results are produced.

From the foregoing description, it will be observed that numerous variations, alternatives and modifications will be apparent to those skilled in the art. Accordingly, this description is to be construed as illustrative only and is for the purpose of teaching those skilled in the art the manner of carrying out the invention. Various changes may be made, materials substituted and features of the invention may be utilized. For example, although the value of "p" in equation (6) can have any value from 1.0 to infinity, in theory, numerical results show that, in practice, p=1.63 is the optimal choice for norm optimization for Ms-Mc shear wave data. Thus, it will be appreciated that various modifications, alternatives, variations, etc., may be made without departing from the spirit and scope of the invention as defined in the appended claims. It is, of course, intended to cover by the appended claims all such modifications involved within the scope of the claims.

We claim:

1. A seismic method, comprising the steps of:

a) acquiring from a sub-surface formation a shear wave data stack from one of a multiple-source/multiple-receiver apparatus, a single-source/multiple-receiver apparatus and a multiple-source/single-receiver apparatus, said shear wave data stack comprising at least a four component data set including: a component with an in-line source and an in-line receiver; a component with an in-line source and a cross-line receiver; a component with a cross-line source and an in-line receiver; and a component with a cross-line source and a cross-line receiver, wherein said components are obtained relative to at least one pre-determined reference axis;

b) converting said data stack into the form of a matrix S(t) having elements $s_{ij}(t)$ where the first subscript refers to the source component index and the second to the receiver component index such that subscripts i and j (i, j=1,2) represent the in-line and the cross-line components, respectively;

c) compute the value of the matrix:

$W(\theta_r,\theta_s,t) = R(\theta_r)S(t)R^{-1}(\theta_s)$ where:

$R(\theta_r)$ is the receiver rotation matrix: $\begin{bmatrix} \cos\theta_r & \sin\theta_r \\ -\sin\theta_r & \cos\theta_r \end{bmatrix}$, $R^{-1}(\theta_s)$ is the inverse of the source matrix $\begin{bmatrix} \cos\theta_s & -\sin\theta_s \\ \sin\theta_s & \cos\theta_s \end{bmatrix}$, and $S(t)$ is the source rotation matrix: $\begin{bmatrix} s_{11}(t) & s_{12}(t) \\ s_{21}(t) & s_{22}(t) \end{bmatrix}$;

d) computing the value of:

$\|e_{ij}(\theta_r,\theta_s)\|_p = \sqrt[p]{\sum_{k=1}^{N} |w_{ij}(\theta_r,\theta_s,k\Delta t + t_0)|^p}$ where: $1 \leq p < \infty$; is a short time window; $\Delta t$ is the sampling interval; $N=(t_1-t_0)/\Delta t$; $\theta_r$ is the rotation angle for the receiver; $\theta_s$ is the rotation angle for the source of the four component data set measured from said at least one pre-determined reference axis of step (a); and $w_{ij}$ are the elements of said matrix $W(\theta_r,\theta_s,t)$;

e) computing the value of
$(\|e_{11}(\theta_r,\theta_s)\|_p + \|e_{22}(\theta_r,\theta_s)\|_p) - (\|e_{12}(\theta_r,\theta_s)\|_p + \|e_{21}(\theta_r,\theta_s)\|_p)$; and f) finding the angles $\theta_r$, and $\theta_s$, where:
$(\|e_{11}(\theta_r,\theta_s)\|_p + \|e_{22}(\theta_r,\theta_s)\|_p) - (\|e_{12}(\theta_r,\theta_s)\|_p + \|e_{21}(\theta_r,\theta_s)\|_p)$
is maximum.

2. The seismic method of claim 1, wherein said sampling interval $\Delta t$ is less than one second.

3. The seismic method of claim 1, wherein said time window $(t_1-t_0)$ is on the order of 0.7 seconds.

4. The seismic method of claim 1, wherein the exponent "p" is on the order of 1.6.

5. The seismic method of claim 1, wherein the shear wave data stack of step (a) is preceded by the step of sending shear wave seismic energy into said sub-surface formation along two orthogonal planes.

6. A seismic method, comprising the steps of:

a) acquiring four component shear wave seismic data $S(t)$ from an anisotropic sub-surface formation;

b) converting said data $S_{(t)}$ into the form of a matrix $W(\theta_r,\theta_s,t)=R(\theta_r)S(t)R^{-1}(\theta_s)$ where:

$R(\theta)$ is a receiver rotation matrix: $\begin{bmatrix} \cos\theta_r & \sin\theta_r \\ -\sin\theta_r & \cos\theta_r \end{bmatrix}$, $R^{-1}(\theta_s)$ is an inverse of the source rotation matrix: $\begin{bmatrix} \cos\theta_s & -\sin\theta_s \\ \sin\theta_s & \cos\theta_s \end{bmatrix}$ $\theta_r$ is the rotation angle for the receiver, and $\theta_s$ is the rotation angle for the source of the components of $S(t)$ relative to a pre-determined reference line;

c) computing a time independent norm of the elements of said matrix $W(\theta_r,\theta_s,t)$ over a relatively short window; and d) finding the angles of rotation $\theta_r$ and $\theta_s$ where the difference between the sum of the norms of the in-line elements and the sum of the norms of cross-line elements is maximized.

7. The method of claim 6, where in step (c) said time independent norm is computed by calculating:

$\|e_{ij}(\theta_r,\theta_s)\|_p = \sqrt[p]{\sum_{k=1}^{N} |w_{ij}(\theta_r,\theta_s,k\Delta t + t_0)|^p}$ where $1 \leq p < \infty$, $\Delta t$ is the sampling interval, $N=(t_1-t_0)/\Delta t$, $t_0$ and $t_1$ are the ends of said time window, and $w_{ij}(\theta_r,\theta_s,t)$ are the elements of $W(\theta_r,\theta_s,t)$.

8. The method of claim 7, where step (d) includes the step of calculating: $(\|e_{11}(\theta_r,\theta_s)\|_p + \|e_{22}(\theta_r,\theta_s)\|_p)$ and $(\|e_{12}(\theta_r,\theta_s)\|_p + \|e_{21}(\theta_r,\theta_s)\|_p)$, where $\|e_{ij}(\theta_r,\theta_s)\|_p$ is the time independent norm of $w_{ij}(\theta_r,\theta_s,t)$.

9. The seismic method of claim 7, wherein step (a) is performed by using at least two polarized sources of shear wave seismic energy and at least two receivers.

10. A seismic method, comprising the steps of:

a) acquiring four component shear wave seismic data from an anisotropic sub-surface formation relative to a reference axis wherein said data set comprises a component with an in-line source and an in-line receiver: a component with an in-line source and a cross-line receiver: a component with a cross-line source and an in-line receiver: and a component with a cross-fine source and a cross-line receiver:

b) converting said data into a matrix that is a function of an angle of rotation relative to said reference axis;

c) computing a time independent norm of the elements of said matrix; and d) determining the angles of rotation where the difference between the sum of the norms of the in-line elements and the sum of the norms of the cross-line elements is maximized.

11. The method of claim 10, where step (a) is performed by using at least two polarized sources of shear wave seismic energy and at least two receivers to acquire four component shear wave seismic data from an anisotropic sub-surface formation.

12. The method of claim 11, wherein said seismic data is acquired from a sub-surface formation-by using one of a multiple-source/multiple-receiver apparatus, a single-source/multiple-receiver apparatus and a multiple-source/single-receiver apparatus.

13. The method of claim 10, where step (c) is performed by computing said norm over a short time window on the order of 500 msec.

14. The method of claim 10, where in step (a) said data components are in the form of a matrix $S(t)$; and wherein step (b) is performed by computing the matrix:

$R(\theta_r)$ is the receiver rotation matrix $\begin{bmatrix} \cos\theta_r & \sin\theta_r \\ -\sin\theta_r & \cos\theta_r \end{bmatrix}$, $R^{-1}(\theta_s)$ is the inverse of the source relation matrix $\begin{bmatrix} \cos\theta_s & -\sin\theta_s \\ \sin\theta_s & \cos\theta_s \end{bmatrix}$, and $\theta_r$ and $\theta_s$ are the angles of rotation for the said data.

15. The method of claim 14, where step (c) is performed by computing the norm of the elements of said matrix $W(\theta_r,\theta_s,t)$ over a time window that is short relative to the length of the seismic trace.

16. The method of claim 15, where said norm is computed by calculating:

$$\|e_{ij}(\theta_r,\theta_s)\|_p = \sqrt[p]{\sum_{k=1}^{N} |w_{ij}(\theta_r,\theta_s,k\Delta t + t_0)|^p}$$

where p is between 1 and infinity, $\Delta t$ is a predetermined sampling interval, $N=(t_1-t_0)/\Delta t$, $t_0$ and $t_1$ are the ends of said time window, and $w_{ij}(\theta_r,\theta_s,t)$ are the elements of said matrix $W(\theta_r,\theta_s,t)$.

17. The method of claim 15, where (d) includes the step of:

(i) calculating the value of:

$$(\|e_{11}(\theta_r,\theta_s)\|_p + \|e_{22}(\theta_r,\theta_s)\|_p) - (\|e_{12}(\theta_r,\theta_s)\|_p + \|e_{21}(\theta_r,\theta_s,t)\|_p)$$

where $\|e_{ij}(\theta_r,\theta_s)\|_p$ is the norm of an element $w_{ij}(\theta_r,\theta_s,t)$ of said matrix $W(\theta_r,\theta_s,t)$ over said time window; and (ii) identifying two angles of rotations $\theta_r$ and $\theta_s$ where said value is maximized.

* * * * *

UNITED STATES PATENT AND TRADEMARK OFFICE
CERTIFICATE OF CORRECTION

PATENT NO.: 5,657,294
DATED: August 12, 1997
INVENTOR(S): Yaohui Zhang

It is certified that error appears in the above-identified patent and that said Letters Patent is hereby corrected as shown below:

| Col. | Line | |
|---|---|---|
| 1 | 42 | "re-splitting each layer" should read --re-splitting at each layer-- |
| 1 | 45 | "surface, Data" should read --surface. Data-- |
| 4 | 58 | "pro-rated component" should read --pre-rotated--. component-- |
| 5 | 22 | insert --will-- before "be minimized" |
| 8 | 25-26 | "cross-fine source" should read --cross-line source-- |
| 8 | 52 | after "matrix:" insert --$W(\theta_r,\theta_s,t)=R(\theta_r)S(t)R^{-1}(\theta_s)$, where-- |

Signed and Sealed this

Second Day of December, 1997

Attest:

Attesting Officer

BRUCE LEHMAN

Commissioner of Patents and Trademarks